Dec. 23, 1947.  J. C. CROWLEY  2,433,094
APPARATUS FOR APPLYING HEAT AND PRESSURE TO STRIP MATERIAL
Original Filed April 23, 1943  3 Sheets-Sheet 1
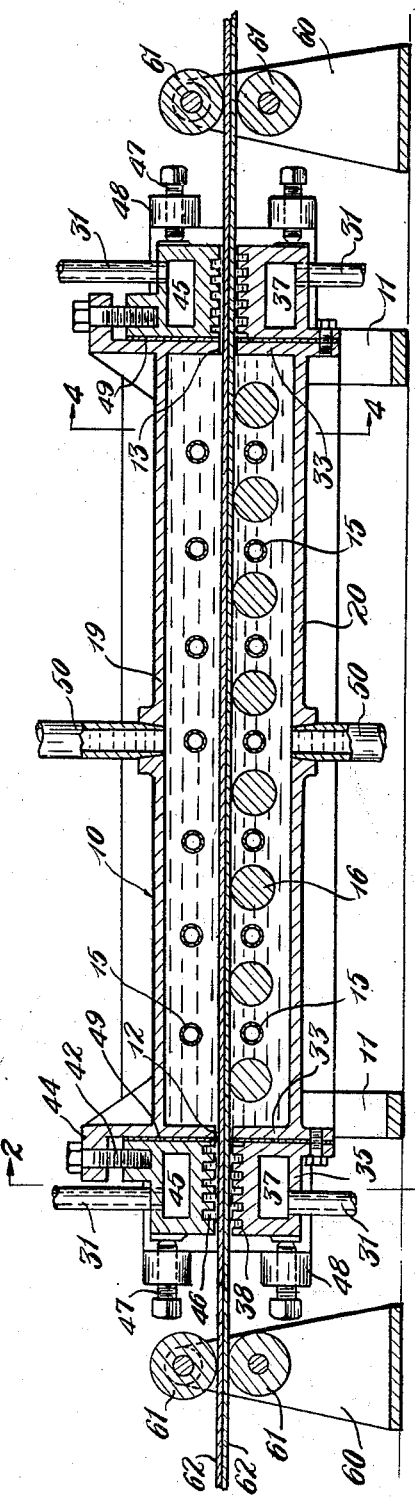
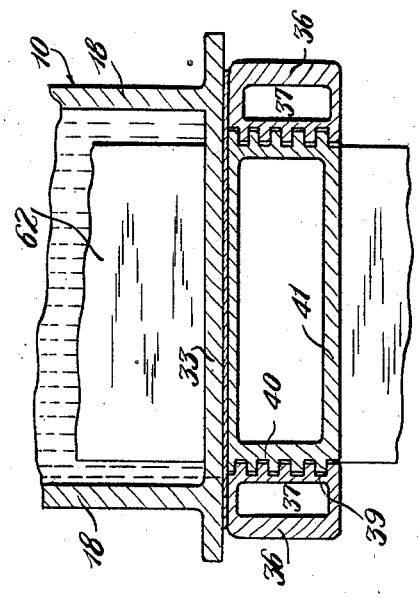
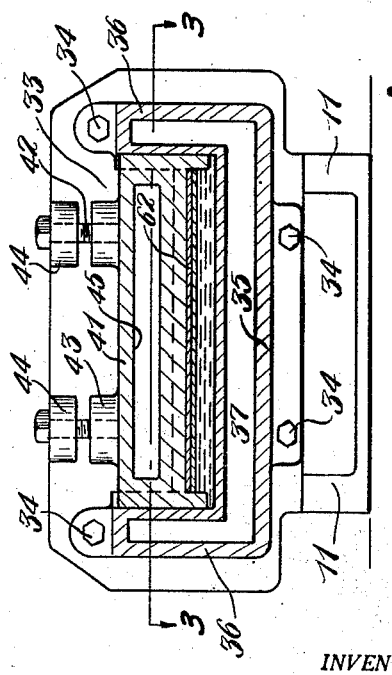
INVENTOR.
BY *John C. Crowley*
*Kwis Hudson & Kent*
ATTORNEYS Dec. 23, 1947.        J. C. CROWLEY        2,433,094
APPARATUS FOR APPLYING HEAT AND PRESSURE TO STRIP MATERIAL
Original Filed April 23, 1943        3 Sheets-Sheet 2
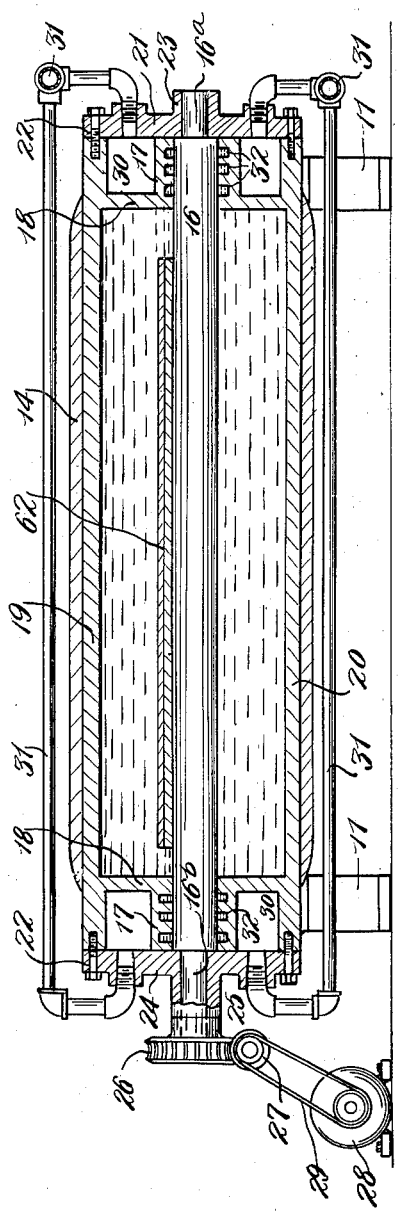
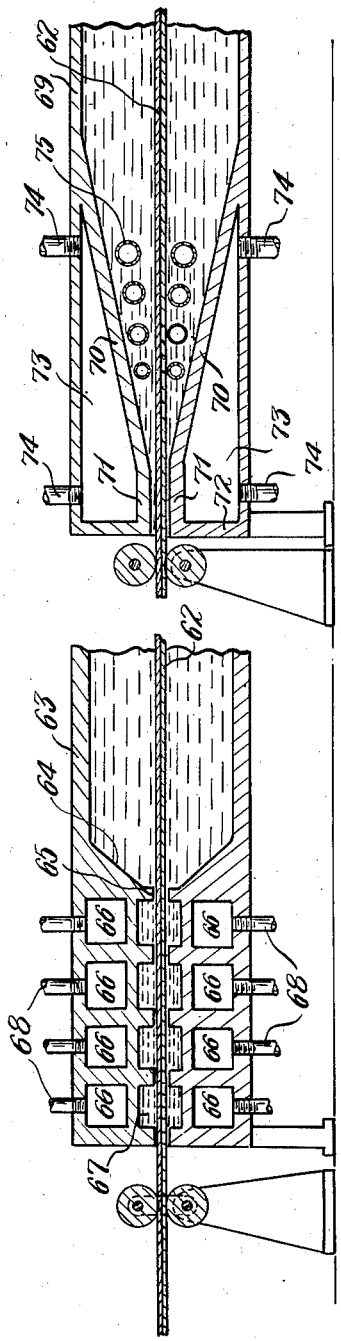
INVENTOR.
JOHN C. CROWLEY
BY
Kwis Hudson & Kent
ATTORNEYS

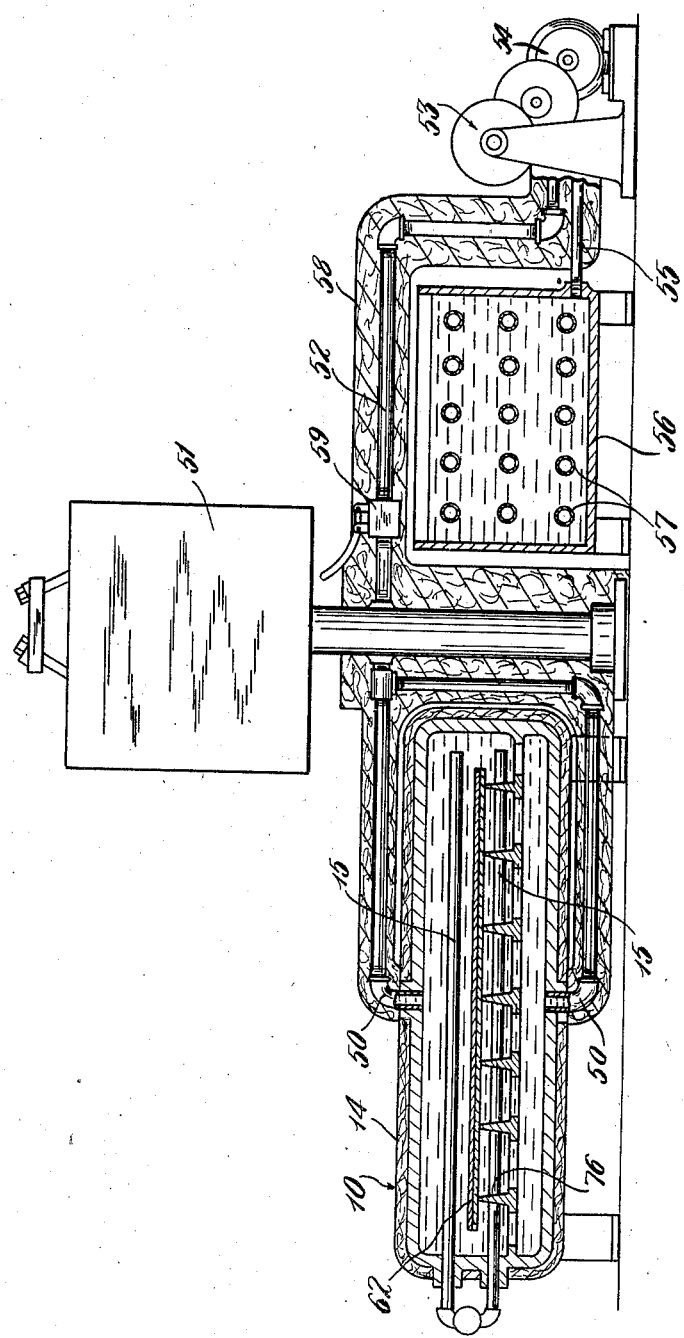

Patented Dec. 23, 1947

2,433,094

UNITED STATES PATENT OFFICE 2,433,094

APPARATUS FOR APPLYING HEAT AND PRESSURE TO STRIP MATERIAL

John C. Crowley, Willoughby, Ohio

Continuation of application Serial No. 484,202, April 23, 1943. This application January 25, 1946, Serial No. 643,341

16 Claims. (Cl. 18—6)

This invention relates to apparatus for applying heat and pressure to strip material. More particularly the invention relates to apparatus for applying heat and pressure to strip material to cure the same and/or to unite multiple plies of strip material into a laminated strip.

This application is a continuation of my application Serial No. 484,202, filed April 23, 1943, for Method and apparatus for applying heat and pressure to strip material, which has become abandoned.

The apparatus may be employed for curing and/or laminating glass, plywood, rubber belting or other forms of strip material as will become apparent hereinafter during the further description of the invention.

Heretofore heat and pressure have been applied to strip material by means of an autoclave or a hydraulic press to cure the material and/or to unite multiple ply material into a laminated structure.

The principal object of the present invention is to provide apparatus for applying heat and pressure to strip material in a continuous and uninterrupted operation as distinguished from the intermittent processes carried out in the usual autoclave or hydraulic press, thus effecting the processing of the strip material in an efficient time and labor saving manner.

Another object of the invention is to provide apparatus for applying heat and pressure to strip material by means of heated fluid or a molten substance under pressure in a sealed chamber but wherein the strip material can be advanced continuously through the sealed chamber without requiring the severance of the strip into separate units or without necessitating the opening of the chamber to receive successive increments of the strip.

Another object is to provide apparatus for applying heat and pressure to strip material by means of heated fluid or a molten substance under pressure in a sealed chamber and wherein the material is continuously advanced through the chamber without any appreciable loss of pressure therein because of leakage of the heated fluid or molten substance.

Another object is to provide apparatus for applying heat and pressure to strip material in a chamber by means of heated fluid or a molten substance under pressure and wherein the chamber is sealed and the pressure retained therein by cooled and solidified portions of the fluid or substance.

Another object is to provide apparatus for applying heat and pressure to strip material as specified in the last named object, and wherein certain portions of the heated fluid or molten substance are cooled and solidified progressively from interiorly of the chamber toward the outer walls thereof to seal necessary openings to the chamber and thus enable the pressure within the chamber to be maintained at the desired degree.

A further object of the invention is to provide an apparatus for applying heat and pressure to strip material which is so constructed that the strip material can be fed continuously through a sealed chamber of a processing device and which chamber contains heated fluid or a molten substance under pressure; the pressure in the chamber being maintained at the desired degree without leakage of the fluid or substance through the inlet and exit openings in the chamber for the strip material or through or around bearings which may be carried by the chamber walls for supporting movable parts of the device.

Another object of the invention is to provide an apparatus for applying heat and pressure to strip material and which is so constructed that the strip material can be fed continuously through a sealed chamber of the apparatus containing heated fluid or a molten substance under pressure and the pressure in the chamber maintained at the desired degree without leakage of the fluid or substance through the inlet and exit openings in the chamber for the strip material by providing in connection with said openings zones which progressively diminish in area toward the outside of the chamber and which function to resist the pressure in the chamber and by progressively cooling and solidifying the fluid or substance in said zones to seal said openings.

Further and additional objects of the invention and advantages derived from the practice thereof will become apparent during the detailed description which is to follow of several embodiments of the invention. Referring to the accompanying drawings, Fig. 1 is a longitudinal vertical sectional view through an apparatus embodying the invention and capable of carrying out the method thereof;

Fig. 2 is a transverse sectional view taken substantially along line 2—2 of Fig. 1, looking in the direction of the arrows;

Fig. 3 is a fragmentary horizontal sectional view taken substantially along line 3—3 of Fig. 2, looking in the direction of the arrows;

Fig. 4 is a transverse vertical sectional view illustrating in elevation one of the propulsion rolls which extend through the sealed chamber of the apparatus and said view is taken substantially along line 4—4 of Fig. 1 but on a larger scale and looking in the direction of the arrows;

Fig. 5 is a fragmentary view similar to the left hand end of Fig. 1 but illustrating a modified arrangement for the inlet opening than that shown in Fig. 1.

Fig. 6 is a view similar to Fig. 5 but illustrating a still different form of inlet opening than is shown in either Fig. 1 or Fig. 5, and Fig. 7 is a transverse vertical sectional view through the apparatus with certain of the parts thereof shown in elevation; the propulsion rolls of Fig. 1 omitted in this view and stationary means provided in lieu thereof in the sealed chamber for supporting the strip material.

Referring to Fig. 1, there is shown an apparatus embodying the invention and which comprises an elongated substantially closed hollow structure 10 which, in the present instance, is of substantially rectangular configuration. The structure 10 is supported at a suitable height from the floor by means of legs 11. The end walls of the structure are provided with horizontally extending slots 12 and 13 located midway between the top and bottom walls of the structure with the slot 12 in the left hand end wall, as viewed in Fig. 1, constituting an inlet slot for the strip material and the slot 13 in the right hand end wall constituting an outlet slot for said material. The interior of the structure constitutes a pressure chamber as will later be referred to. The structure 10 may be enclosed partially or completely in suitable insulating material 14, as indicated in Figs. 4 and 7. Vertically spaced series of heating elements 15 extend across the interior of the structure 10 with each series including a plurality of heating elements spaced longitudinally of the structure.

The heating elements 15 may be electrical heating elements or they may be conduits in which steam, hot air or other heating medium is circulated. Although the heating elements may all generate the same degree of heat there may be instances wherein it would be advantageous to have the elements graduated as to the degree of heat generated thereby as, for example, the elements nearer the center of the structure could be the hottest, while the elements approaching each end of the structure progressively could diminish in their heat producing capacities. The heating elements are connected, of course, to a suitable supply source, not shown, since the manner in which this would be done is well understood in the art.

A series of longitudinally spaced horizontally positioned propulsion rolls 16 extend transversely of the interior of the structure and are suitably supported in bearing bosses 17 formed integral with the side walls 18 of the structure, see Fig. 4. The strip material passing through the structure rests upon and is moved by the propulsion rolls 16, as clearly indicated in Figs. 1 and 4. The upper wall 19 and the bottom wall 20 of the structure are extended along their longitudinal edges beyond the side walls 18 and said extended portions of the upper and bottom walls are parallel to the bearing bosses 17 and of the same length. A closure plate 21 is secured to the outer ends of said extending portions of the upper and bottom walls 19 and 20 at the right hand side of the structure, as viewed in Fig. 4, by means of suitable securing elements 22. The plate 21 is provided with bearing bosses 23 which rotatably receive the reduced right hand end portions 16a of the propulsion rolls, wherefore it will be seen that the plate 21 retains the propulsion rolls 16 against axial displacement toward the right as viewed in the drawings.

At the left hand side of the structure, as viewed in Fig. 4, a closure plate 24 is secured to the outer ends of the extended portions of the top and bottom walls 19 and 20 by suitable securing means 22. The closure plate 24 is provided with elongated bearing bosses 25 which rotatably receive relatively long reduced end portions 16b of the rolls 16. The plate 24 retains the rolls 16 against axial displacement toward the left, as viewed in Fig. 4, while the reduced portions 16b of the rolls are of such length as to project outwardly beyond the outer ends of the bearing bosses 25. All of the rolls 16 are considered as driven propulsion rolls and the outwardly projecting ends of the reduced portion 16b of the rolls as having fixed thereto worm wheels 26. It will be understood that certain of the rolls 16 may be idler rolls and not driven, if desired, and in such event the outer ends of the reduced portions 16b of said idler rolls would not have worm wheels 26 fixed thereto. The propulsion rolls may be driven at any suitable or desired speed by a worm shaft 27 driven by an electric motor 28 operatively connected to the worm shaft 27 by suitable connecting means such as the endless belt or chain 29 passing around suitable pulleys or sprockets fixed to the worm shaft 27 and to the spindle of the motor 28.

The side walls 18, the closure plates 21 and 24 and the extended portions of the top and bottom walls 19 and 20 of the structure provide cooling compartments 30 in which the bearing bosses 17 are located. Suitable coolant, which may be water or a suitable liquid or fluid is circulated through the compartments 30 by means of a fluid circulating conduit system indicated in Fig. 4 generally by the numeral 31 and which system is in communication with the compartments through suitable openings formed in the closure plates 21 and 24, as clearly illustrated.

It will be understood that the cooling medium which is circulated through the conduit system 31 and the compartments 30 can be provided from any suitable source of supply and can be circulated by any suitable circulating means which may be simply the usual water supply system of the building containing the apparatus.

The bearing bosses 17 are each provided with one or more annular grooves 32 in communication with the bores through the bosses and for a purpose later to be made apparent.

The end walls 33 of the structure and which contain the inlet and outlet slots 12 and 13 have fixedly secured thereto by means of suitable securing elements 34 U-shaped members having a base 35 and upwardly extending legs 36 (see Figs. 1, 2 and 3). The base 35 and the legs 36 of each U-shaped member are hollow, wherefore each member is provided with a cooling compartment 37 also U-shaped as clearly indicated in Fig. 2. The upper side of the base 35 of each member is provided with one or more grooves 38 extending longitudinally of the base and transversely of the apparatus. If more than one of the grooves 38 is employed such grooves are spaced in a longitudinal direction with respect to the apparatus as shown in Fig. 1.

The inner side of each leg 36 of each member is provided with vertically extending transversely spaced ribs 39 forming therebetween channels which slidably receive ribs 40 formed on the opposite ends of a vertically adjustable member 41 located between the legs 26 of the U-shaped member. The members 41 can be adjusted vertically and secured in adjusted position by means of adjusting bolts 42 which screw into threaded bosses 43 formed on the upper side of the members 41.

The bolts 42 are carried in overhanging bracket portions 44 formed on the opposite ends of the structure 10 as clearly shown in Figs. 1 and 2. The members 41 are each provided with a cooling compartment 45 and which, like the cooling compartments 37 in the U-shaped members, can have a cooling medium circulated therein. The cooling compartments 37 and 45 are connected to a supply source of the cooling medium by means of suitable inlet and outlet conduits forming part of the conduit system 31, although only one such conduit is illustrated in Fig. 1 for each cooling compartment 37 or 45.

The members 41 on their undersides are provided with one or more grooves 46 extending longitudinally of the members and for a purpose later to become clear. If more than one such groove 46 is employed said grooves preferably will be staggered with respect to the grooves 38 in the upper side of the base 35 of the U-shaped members, as indicated in Fig. 1.

In order to securely clamp the U-shaped members and the members 41 in position on the ends of the structure 10 and to impart stability thereto clamping bolts 47 are provided and which bolts screw through tapped openings in bracket portions 48 formed on extensions of the structure 10 and engaging against thickened portions of the U-shaped members and the members 41 as shown in Fig. 1. Suitable packing 49 may be interposed between the ends of the structure 10 and the U-shaped members and the members 41.

In using the apparatus it is proposed to introduce into the interior of the structure 10, that is into the pressure chamber, a heated fluid under pressure and which fluid functions to apply heat and pressure to the strip material passing through the pressure chamber. The fluid which is introduced into the chamber is preferably formed from a substance which has a relatively low melting point and can be subjected to pressure when in liquid or molten condition. This substance in its solid or eutectic state should possess high ductility. As examples of suitable substances for this purpose reference is made to any of the well known fusible metals and compositions thereof and also to wax, paraffine, phenolic resins or compositions thereof, all of which have a melting point at or below the desired temperature to which the strip material is to be subjected and which substances when cooled and solidified are pliable and ductile.

The heated fluid or molten substance is introduced into the pressure chamber through conduits 50 communicating with the chamber through the top and bottom walls 19 and 20 thereof. Supplementing Fig. 1 with the disclosure of Fig. 7 it will be seen that the conduits 50 are connected with an accumulator 51 which is shown diagrammatically in Fig. 7 since it may be of any well known and conventional construction. The accumulator is connected by a conduit 52 to the output side of a pressure pump mechanism indicated diagrammatically at 53 and of any well known and conventional construction. The pump mechanism 53 may be driven by an electric motor 54 through a suitable driving connection between it and the motor. The intake side of the pump mechanism is connected by a conduit 55 with a reservoir 56 for containing a source of supply of the heated fluid or molten substance which is introduced under pressure into the pressure chamber. The reservoir 56 is heated to bring the substance into molten condition and to the required temperature and to maintain the same in that state, and the heating of the reservoir may be accomplished in various well known ways as, for example, by means of heating units 57 located within the reservoir. These heating units may be steam pipes, electric heating units or other suitable and well known means and which can be supplied with the heating medium in known manner from a suitable supply source.

The conduits 50, 52 and 55 are enclosed in suitable insulation 58 to maintain the substance in molten condition and at the desired temperature. It will be understood that the heated fluid or molten substance is forced by the pump mechanism 53 through the conduits 50 into the pressure chamber and the temperature of the fluid or molten substance is maintained at the desired level in the chamber by the heating units 15.

The accumulator 51 functions to maintain the desired pressure on the molten substance in the pressure chamber, and in case said pressure drops a check valve 59 in the conduit 52 automatically opens until the desired pressure is restored, whereupon said valve automatically closes.

At each end of the apparatus there is located a suitable standard 60 which supports a pair of rollers 61 which are power driven in opposite directions by suitable means, not shown, since it is well known in the art, and said rollers constitute feed rollers for continuously advancing the strip material through the pressure chamber.

In order to bring out the utility of the construction heretofore described an explanation of its operation will now be explained. In the explanation the strip material which is to be processed will be assumed to be two plies of glass 62 which are to be united into a laminated strip by the application of heat and pressure in the pressure chamber. The strip material passes between the feed rolls 61 at the inlet side of the apparatus and through the space between the upper side of the base of the U-shaped member at said end of the apparatus and the lower side of the member 41 and thence through the inlet slot 12 of the end wall 33. The strip material is then moved forwardly and supported by the rolls 16 within the pressure chamber and passes outwardly of the chamber through the outlet slot 13 in the end wall 33 and thence between the base of the right hand U-shaped member and the underside of the right hand member 41 from whence it extends between the feed rolls 61.

Assuming that the strip material is in the relationship just described and that the pressure chamber is filled with the heated molten substance or fluid at the desired temperature and under the required pressure, this molten substance or fluid applies the heat and pressure to the strip material for the purpose, in the present instance, of uniting the two plies of the strip and a plastic material therebetween into a laminated structure. However, if provision for adequately sealing the pressure chamber is not provided the molten substance or fluid will leak from the chamber and the pressure in the chamber will fall to a point where the strip material cannot be processed properly, if at all.

In order to prevent leakage of the substance or fluid from the chamber and to maintain the proper pressure therein and at the same time to allow the material to be fed through the pressure chamber from one end to the other thereof in a continuous strip it is proposed to utilize the molten substance or fluid itself to provide the requisite pressure seals at the inlet and outlet ends of the pressure chamber and also at the bearings for the rolls 16. The molten substance in the pressure chamber being under pressure it will be forced through the inlet opening 12 and the outlet opening 13 around the strip material and such substance will fill the grooves 38 of the base 35 of the U-shaped members and the grooves 46 of the adjustable members 41. However, due to the circulation of a cooling medium through the cooling compartments 37 and 45 the substance which has thus been forced around the strip material and between the members 41 and the U-shaped members will be cooled and solidified and serves as a seal against the leakage of the molten substance from the pressure chamber, thereby preventing any reduction in the pressure maintained on the substance within the pressure chamber.

As previously explained, the substance employed when in its solid state is ductile and pliable and, therefore, would not hinder the passage of the strip material through those portions of the substance which have been cooled and solidified at the inlet and outlet ends of the apparatus.

Reference is now made to Fig. 4 for the purpose of explaining the manner in which the molten substance itself furnishes the sealing means at the bearings for the rolls 16. The molten substance within the pressure chamber of the structure 10 being under pressure will be forced along the ends of the rolls 16 and into the bearing bosses 17 and will fill the grooves 32 formed in said bearing bosses. However, since a cooling medium is circulated through the cooling compartments 30 the material which has been forced around the ends of the rolls 16 and into the grooves 32 will be cooled and solidified and will serve as an efficient seal against the escape of the molten substance from the pressure chamber through the bearings for the rolls 16 thus preventing loss of pressure within the chamber.

From the foregoing it will be seen that the strip material can be fed continuously or intermittently through the pressure chamber in continuous strip form and heat and pressure applied to the strip material to process the same. This feeding movement of the strip material through the pressure chamber and at the desired rate is possible because of the efficient seals provided by the cooled and solidified molten substance at all openings to the chamber. The advantages incident to the ability of moving the strip material through the pressure chamber in continuous strip form are substantial ones and constitute a major progression in the art over the use of the usual autoclave or hydraulic press as hereinbefore referred to.

As previously stated, the molten substance in the pressure chamber might be progressively cooled toward the opposite ends of the chamber, that is progressively cooled toward the inlet and exit ends to gradually solidify and reduce the pressure of the molten substance and thus effect an efficient seal.

Referring to Fig. 5, a modified form of construction is illustrated for the inlet end of the pressure chamber, it being understood that the outlet end thereof will be similarly constructed. The structure containing the pressure chamber is indicated at 63 and the opposite ends of the chamber are defined by tapered wall portions 64. The tapered wall portion contains a horizontal transversely extending slot 65 constituting either an inlet slot or an outlet slot to or from the pressure chamber and beyond such slot the structure is provided internally with ribs forming cooling compartments 66 and recesses 67, with the latter located on opposite sides of the strip material and adapted to be filled with the cooled and solidified or partially solidified molten substance from the pressure chamber during the operation of the apparatus.

The coolant compartments 66 are connected by conduits 68 to a source of supply of cooling medium which is circulated through the conduits and the compartments.

It will be seen that during the operation of the apparatus the molten substance which passes through the slot 65 and into the recesses 67 and around the strip material will be progressively cooled from adjacent the slot 65 outwardly to the end of the structure 63, and as such substance is progressively cooled it will be gradually solidified. Of course as the substance is gradually solidified the pressure thereof is gradually reduced. As illustrative of this gradual reduction in temperature and pressure we will assume that the molten substance in the pressure chamber is at 250° F. and under 250# pressure. The substance in the most right hand recess 67 is cooled for instance to 200° F. so the resultant reduction in its pressure is to 200#. The substance in the next recess 67 is reduced to a temperature of 150° F. and to a pressure of 150#, while in the next recess the temperature of the substance will be reduced to 100° F. and the pressure thereof to 100#. In the most outwardly of the recesses 67 the temperature of the substance will be reduced to 50° F. and the presure there of to 50# and at this time such substance will be solid but dutcile and will provide an adequate seal through which the strip material can be passed as it is fed through the apparatus.

Referring to Fig. 6, the structure 69 containing the pressure chamber is provided adjacent the inlet and outlet ends of the pressure chamber with internal downwardly inclined walls 70 which merge into straight and shorter wall portions 71 that extend to the end walls 72 of the structure. The internal walls 70 define a conical or tapered portion of the pressure chamber which merges at its small end into a reduced slot defined by the wall portions 71 and constituting either a horizontally extending inlet or outlet opening. The internal walls 70, wall portions 71, end walls 72 and the outer walls of the structure define wedge shaped cooling compartments 73 in which a cooling medium can be circulated by means of the conduits 74.

Internally of the structure 69 and within the conical or tapered portion of the pressure chamber defined by the inclined internal walls 70 there are arranged one or more cooling conduits 75 extending transversely of the pressure chamber and through which a cooling medium can be circulated. In the construction illustrated these cooling conduits are shown as eight in number arranged in two series of four conduits each. Although all of the conduits may be of the same size or may have the same cooling capacity, said conduits are illustrated as decreasing in size or cooling capacity from the larger part of the conical or tapered portion of the pressure chamber toward the smaller part thereof; that is, the innermost cooling conduits, as viewed in Fig. 6, will have the greatest cooling capacity, since they are located in the largest volume of the molten substance. The cooling capacities of the conduits 75 may gradually decrease toward the end of the chamber, in accordance with the reduction in volume of the molten substance surrounding the conduits.

It will be seen that the cooling conduits 75 function to progressively cool the molten substance from the pressure chamber outwardly toward the inlet or outlet openings. Inasmuch as the molten substance tends to solidify as it is cooled with a proportional reduction in the pressure thereof, it will be seen that the pressure is progressively reduced from the pressure chamber toward the inlet or outlet openings. The molten substance beyond the outermost conduits 75 will be further cooled and solidified by the cooling compartments 73 and will serve to seal the inlet and outlet openings.

Referring to Fig. 7 it will be seen that the structure 10 which contains the pressure chamber differs from the structure shown in Fig. 1 in that the propulsion rolls 16 are omitted. The strip material in the form of construction shown in Fig. 7 instead of being supported by the propulsion rolls 16 as the strip travels through the pressure chamber is supported by a plurality of transversely spaced longitudinally extending rigid supporting ribs or rails 76, it being understood that the movement of the strip material through the pressure chamber of Fig. 7 will be occasioned solely by the action of the rolls 61 located externally of each end of the pressure chamber.

Although several preferred embodiments of the invention have been illustrated and described herein, it will be understood that the invention is susceptible of various modifications and adaptations within the scope of the appended claims.

Having thus described my invention, I claim:

1. An apparatus for applying heat and pressure to an article comprising a structure provided with a pressure chamber and having an inlet opening for said article, means for continuously circulating the same heated molten substance under pressure through said chamber and in contact with said article therein, and means adjacent to said opening and providing a passage in alignment with said opening and through which passage said article passes, said last named means including a cooling compartment substantially surrounding said passage and adapted to have a cooling medium circulated therein to cool and solidify those portions of the substance which have entered said passage through said opening, said cooled and solidified portions forming a seal against the leakage of said substance from said chamber.

2. An apparatus for applying heat and pressure to an article comprising a structure provided with a pressure chamber and having an inlet opening for said article, means for continuously circulating the same heated molten substance under pressure through said chamber and in contact with said article therein, and means secured to said structure and providing a passage in alignment with said opening and through which passage said article passes in entering said chamber, said last named means including a cooling compartment substantially surrounding said passage and adapted to have a cooling medium circulated therein to cool and solidify those portions of the substance which have entered said passage through said openings, said cooled and solidified portions forming a seal against the leakage of said substance from said chamber.

3. An apparatus for applying heat and pressure to an article comprising a structure provided with a pressure chamber and having inlet and outlet openings for said article located at opposite ends of said chamber, means for continuously circulating the same heated molten substance under pressure through said chamber and in contact with said article, and means operatively associated with said structure adjacent said openings and providing passages in alignment with said openings and through which passages said article passes, said last named means including cooling compartments substantially surrounding said passages and adapted to have cooling medium circulated therein to cool and solidify those portions of the substance which have entered said passages through said openings, said cooled and solidified portions forming seals against the leakage of said substance from said chamber.

4. An apparatus for applying heat and pressure to an article comprising a structure provided with a pressure chamber and having inlet and outlet openings for said article, means for continuously circulating the same heated molten substance under pressure through said chamber and in contact with said article, and means secured to said structure and providing passages in alignment with said openings and through which passages said article passes in entering and leaving said chamber, said last named means including cooling compartments substantially surrounding said passages and adapted to have a cooling medium circulated therein to cool and solidify those portions of the substance which have entered said passages through said openings, said cooled and solidified portions forming seals against the leakage of said substance from said chamber.

5. An apparatus for applying heat and pressure to an article comprising a structure provided with a pressure chamber and having in its walls bearings for movable article supporting parts of the apparatus, means for positioning the article in said chamber, means for introducing a heated molten substance under pressure into said chamber to fill the latter and contact the article therein, and means operatively associated with said structure for cooling and solidifying portions of said substance adjacent to said bearings to prevent leakage of the substance from said chamber through said bearings.

6. An apparatus for applying heat and pressure to an article comprising a structure provided with a pressure chamber and having an inlet opening for said articles; said structure also being provided in its walls with bearings for movable article supporting parts of the apparatus, means for introducing a heated molten substance under pressure into said chamber to fill the latter and contact the article therein, and means operatively associated with said structure for cooling and solidifying portions of said substance adjacent said opening and said bearings to prevent leakage of said substance from said chamber through said opening and bearings.

7. An apparatus for applying heat and pressure to an article comprising a structure provided with a pressure chamber and having in its walls bearings for movable article supporting parts of the apparatus, said bearings being provided with grooves communicating with the bores through said bearings, means for introducing a heated molten substance under pressure into said chamber and in contact with the article therein, and means operatively associated with said structure adjacent said bearings for cooling and solidifying said substance which tends to leak from the pressure chamber through said bearings and into said grooves.

8. An apparatus for applying heat and pressure to an article comprising a structure provided with a pressure chamber and having an inlet opening for said article, means for introducing a heated molten substance under pressure into said chamber and in contact with said article therein, means operatively associated with said structure adjacent said opening and providing a passage in alignment with said opening and through which passage said article passes in entering said chamber, said last named means including cooling compartments substantially surrounding said passage and adapted to have a cooling medium circulated therein to cool and solidify those portions of the substance which have entered said passage, said structure also being provided in its walls with bearings for movable article supporting parts of the apparatus, means for positioning the article in said chamber upon said parts, and means operatively associated with said structure for cooling and solidifying portions of said substance adjacent said bearings to prevent leakage of the substance from said chamber through said bearings.

9. An apparatus for applying heat and pressure to an article comprising a structure provided with a pressure chamber and having inlet and outlet openings for said article adjacent opposite ends of said chamber, means for introducing a heated molten substance under pressure into said chamber and in contact with said article, means operatively associated with said structure adjacent said openings and providing passages in alignment with said openings and through which passages said article passes in moving through said chamber, said last named means including cooling compartments substantially surrounding said passages and adapted to have a cooling medium circulated therein to cool and solidify those portions of the substance which have entered said passages and thus provide seals against the leakage of said substance from said chamber, said structure also being provided in its walls with bearings for movable article supporting parts of the apparatus, means for positioning the article in said chamber and upon said parts, and means operatively associated with said structure for cooling and solidifying the portions of said substance adjacent to said bearings to prevent leakage of the substance from said chamber through said bearings.

10. An apparatus for applying heat and pressure to an article comprising a structure provided with a pressure chamber and having an inlet opening for said article, means for introducing a heated molten substance under pressure into said chamber and in contact with said article therein, and means adjacent to said opening and providing a passage in alignment with said opening and through which passage said article passes, said last named means having a series of recesses spaced longitudinally of said passage and communicating therewith, said last named means including a cooling compartment substantially surrounding said passage and adapted to have a cooling medium circulated therein to cool and solidify those portions of the substance which have entered said passage and said recesses through said opening, said cooled and solidified portions in said recesses forming sealing rings to prevent the leakage of said substance from said chamber.

11. An apparatus as defined in claim 10 and wherein there is a series of cooling compartments spaced longitudinally of the passage and corresponding in number to the number of said recesses and substantially surrounding said passage.

12. An apparatus for applying heat and pressure to an article comprising a structure provided with a pressure chamber and having inlet and outlet openings for said article located at the opposite ends of said chamber, means for introducing a heated molten substance under pressure into said chamber and in contact with said article, and means operatively associated with said structure adjacent said openings and providing passages in alignment with said openings and through which passages said article passes, said last named means having series of recesses spaced longitudinally of said passage and communicating therewith, said last named means including cooling compartments substantially surrounding said passages and adapted to have cooling medium circulated therein to cool and solidify those portions of the substance which have entered said passages and said recesses through said openings, said cooled and solidified portions in said recesses forming sealing rings to prevent the leakage of said substance from said chamber.

13. An apparatus as defined in claim 12 and wherein there is provided series of cooling compartments spaced longitudinally of the passages and corresponding in number to the number of said recesses.

14. An apparatus for applying heat and pressure to an article comprising a structure provided with a pressure chamber and having an opening through which said article may extend, means for introducing a heated molten substance under pressure into said chamber and in contact with the article therein, said structure adjacent said opening being provided with interior wall means forming a portion of said chamber and of outwardly diminishing tapered configuration and communicating with said opening, said structure also being provided with a cooling compartment substantially surrounding said interior wall means and adapted to have a cooling medium circulated therein to cool and solidify those portions of the substance which are within said interior wall means, said cooled and solidified portions of said substance forming a seal against the leakage of said substance from said chamber through said opening.

15. Apparatus as defined in claim 14 and wherein a series of cooling conduits spaced longitudinally of said chamber are located within said interior wall means.

16. An apparatus as defined in claim 14 and wherein series of cooling conduits spaced longitudinally of said chamber are located within said interior wall means with the cooling capacities of the conduits of said series gradually decreasing toward said opening.

JOHN C. CROWLEY.

REFERENCES CITED

The following references are of record in the file of this patent:

UNITED STATES PATENTS

| Number | Name | Date |
|---|---|---|
| 2,293,840 | Lignian | Aug. 25, 1942 |

FOREIGN PATENTS

| Number | Country | Date |
|---|---|---|
| 505,162 | Great Britain | May 5, 1939 |